(12) United States Patent
Clement et al.

(10) Patent No.: US 12,443,719 B2
(45) Date of Patent: Oct. 14, 2025

(54) FALSE POSITIVE VULNERABILITY DETECTION USING NEURAL TRANSFORMERS

(71) Applicant: MICROSOFT TECHNOLOGY LICENSING, LLC., Redmond, WA (US)

(72) Inventors: Colin Bruce Clement, Seattle, WA (US); Matthew Glenn Jin, Seattle, WA (US); Anant Girish Kharkar, Huntersville, NC (US); Xiaoyu Liu, Sammamish, WA (US); Xin Shi, Kirkland, WA (US); Neelakantan Sundaresan, Bellevue, WA (US); Roshanak Zilouchian Moghaddam, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 17/687,529

(22) Filed: Mar. 4, 2022

(65) Prior Publication Data
US 2023/0281317 A1 Sep. 7, 2023

(51) Int. Cl.
*G06F 21/57* (2013.01)
*G06F 8/75* (2018.01)
*G06N 3/10* (2006.01)

(52) U.S. Cl.
CPC .............. *G06F 21/577* (2013.01); *G06F 8/75* (2013.01); *G06N 3/10* (2013.01); *G06F 2221/033* (2013.01)

(58) Field of Classification Search
CPC .... G06F 21/577; G06F 8/75; G06F 2221/033; G06N 3/10; G06N 3/0455; G06N 3/084; G06N 3/09
See application file for complete search history.

(56) References Cited

U.S. PATENT DOCUMENTS

| | | | |
|---|---|---|---|
| 2017/0212829 A1* | 7/2017 | Bales | G06F 8/75 |
| 2019/0287515 A1* | 9/2019 | Li | G06N 3/084 |
| 2021/0157926 A1* | 5/2021 | Handurukande | G06F 21/563 |
| 2022/0014554 A1* | 1/2022 | Vasu | H04L 63/102 |
| 2024/0028740 A1* | 1/2024 | Chan | G06F 21/577 |

OTHER PUBLICATIONS

"Coverity", Retrieved from: https://scan.coverity.com/, Feb. 12, 2022, 4 Pages.

(Continued)

*Primary Examiner* — William J. Goodchild
(74) *Attorney, Agent, or Firm* — Workman Nydegger

(57) ABSTRACT

A false positive vulnerability system detects whether a software vulnerability identified by a static code vulnerability analyzer is a true vulnerability or a false positive. The system utilizes deep learning models to predict whether an identified vulnerability is accurate given the source code context of the identified vulnerability. A neural encoder transformer model is trained to classify a false positive given the method body including the identified vulnerability. A neural decoder transformer model is trained to predict a candidate line-of-code to complete a prompt inserted into the context of the identified vulnerability. The candidate line-of-code that successfully completes the prompt is used as a signal to identify that the identified vulnerability is a false positive.

20 Claims, 7 Drawing Sheets

(56) References Cited

OTHER PUBLICATIONS

"SonarQube", Retrieved From: https://web.archive.org/web/20220308063059/https://www.sonarqube.org/, Retrieved Date: Mar. 8, 2022, 4 Pages.

Ayewah, et al., "Using FindBugs on Production Software", In proceedings of conference on Object-oriented programming systems and applications companion, Oct. 21, 2007, pp. 805-806.

Ayewah, et al., "Using Static Analysis to Find Bugs", In Journal of IEEE Software, vol. 25, Issue 5, Aug. 19, 2008, pp. 22-29.

Bielik, et al., "Learning a static analyzer from data", In 29th International Conference on Computer Aided Verification, Jul. 24, 2017, pp. 233-253.

Brown, et al., "Language Models are Few-Shot Learners", In Repository of arXiv:2005.14165v4, Jul. 22, 2020, pp. 1-75.

Choi, et al., "End-to-End Prediction of Buffer Overruns from Raw Source Code via Neural Memory Networks", In Repository of arXiv:1703.02458v1, Mar. 7, 2017, 7 Pages.

Devlin, et al., "BERT: Pre-training of Deep Bidirectional Transformers for Language Understanding", In Repository of arXiv:1810.04805v1, Oct. 11, 2018, 14 Pages.

Do, et al., "Why Do Software Developers Use Static Analysis Tools? A User-Centered Study of Developer Needs and Motivations", In Journal of IEEE Transactions on Software Engineering, Jun. 24, 2020, pp. 1-13.

Feng, et al., "CodeBERT: A Pre-Trained Model for Programming and Natural Languages", In Proceedings of the Conference on Empirical Methods in Natural Language Processing: Findings, Nov. 16, 2020, pp. 1536-1547.

Husain, et al., "CodeSearchNet Challenge: Evaluating the State of Semantic Code Search", In Repository of arXiv:1909.09436v1, Jun. 8, 2020, 6 Pages.

Johnson, et al., "Why Don't Software Developers Use Static Analysis Tools to Find Bugs?", In Proceedings of International Conference on Software Engineering, May 18, 2013, pp. 672-681.

Junker, et al., "SMT-based false positive elimination in static program analysis", In Proceedings of International Conference on Formal Engineering Methods, Nov. 12, 2012, pp. 1-16.

Li, et al., "VulDeePecker: A deep learning-based system for vulnerability detection", In Repository of arXiv:1801.01681v1, Jan. 5, 2018, pp. 1-15.

Lin, et al., "Traceability Transformed: Generating more Accurate Links with Pre-Trained BERT Models", In Repository of arXiv:2102.04411v2, Feb. 22, 2021, 12 Pages.

Liu, et al., "RoBERTa: A Robustly Optimized BERT Pretraining Approach", In Repository of arXiv:1907.11692v1, Jul. 26, 2019, 13 Pages.

Muske, et al., "Review efforts reduction by partitioning of static analysis warnings", In 13th IEEE International Working Conference on Source Code Analysis and Manipulation, Sep. 22, 2013, pp. 106-115.

Pang, et al., "Predicting vulnerable software components through n-gram analysis and statistical feature selection", In 14th IEEE International Conference on Machine Learning and Applications (ICMLA), Dec. 9, 2015, pp. 543-548.

Pradel, et al., "DeepBugs: A Learning Approach to Name-Based Bug Detection", Proceedings of the ACM on Programming Languages, vol. 2, Nov. 2018, pp. 1-25.

Radford, et al., "Language Models are Unsupervised Multitask Learners", In Journal of OpenAI Blog, vol. 1, Issue 8, Feb. 24, 2019, 24 Pages.

Russell, et al., "Automated vulnerability detection in source code using deep representation learning", In 17th IEEE International Conference on Machine Learning and Applications, Dec. 17, 2018, pp. 757-762.

Shen, et al., "EFindBugs: Effective Error Ranking for Find Bugs", In Fourth IEEE International Conference on Software Testing, Verification and Validation, Mar. 21, 2011, pp. 299-308.

Svyatkovskiy, et al., "IntelliCode Compose: Code Generation Using Transformer", In Repository of arXiv:2005.08025v2, Oct. 29, 2020, 11 Pages.

Tripp, et al., "ALETHEIA: Improving the Usability of Static Security Analysis", In Proceedings of the ACM SIGSAC Conference on Computer and Communications Security, Nov. 3, 2014, pp. 762-774.

Tufano, et al., "Towards Automating Code Review Activities", In Repository of arXiv:2101.02518v4, May 19, 2021, 12 Pages.

Vaswani, et al., "Attention Is All You Need", In Proceedings of 31st Conference on Neural Information Processing Systems, Dec. 4, 2017, 11 Pages.

Viega, et al., "ITS4: A static vulnerability scanner for C and C++ code", In Proceedings of 16th Annual Computer Security Applications Conference, Dec. 11, 2000, pp. 257-267.

Wang, et al., "Automatically Learning Semantic Features for Defect Prediction", In Proceedings of the 38th International Conference on Software Engineering, May 14, 2016, pp. 297-308.

Wang, et al., "Bugram: Bug Detection with N-Gram Language Models", In Proceedings of the 31st IEEE/ACM International Conference on Automated Software Engineering, Sep. 3, 2016, pp. 708-719.

Wolf, et al., "HuggingFace's Transformers: State-of-the-art Natural Language Processing", In Repository of arXiv:1910.03771v5, Jul. 14, 2020, 8 Pages.

Xu, et al., "A memory model for static analysis of C programs", In Proceedings of International Symposium On Leveraging Applications of Formal Methods, Verification and Validation, Oct. 18, 2010, 14 Pages.

* cited by examiner

FALSE POSITIVE VULNERABILITY DETECTION USING NEURAL TRANSFORMERS

BACKGROUND

During the development of a software program, a range of measures is taken to ensure that the program is tested prior to its release and distribution. These measures are aimed at reducing the number of errors in the program in order to improve the quality of the program. Tests are used to identify program errors for a limited number of cases since it is impossible to test all possible user scenarios. Tests are ineffective at discovering unknown defects, such as software vulnerabilities. A software vulnerability is a flaw in a program resulting from a weakness that can cause a negative impact in the executing program. Software vulnerabilities include resource leaks, memory leaks, null pointer dereferences, and concurrency errors, which are difficult to detect deterministically.

Developers rely on various tools to detect a vulnerability. Some tools either report a significant number of false positives which require a developer to manually verify each warning or miss vulnerabilities due to a high false negative rate. A false positive incorrectly indicates that the vulnerability exists and a false negative incorrectly indicates that a vulnerability does not exist. Detecting a software vulnerability prior to the release of the program is a preferred solution. However, when a program includes tens of millions of lines of code, the detection of a true vulnerability becomes a complicated task that needs to be performed within the constraints of resource and developer availability which may be limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A false positive vulnerability system detects whether a software vulnerability identified by a static code vulnerability analyzer is a true vulnerability or a false positive. The system utilizes one or more deep learning models to predict whether an identified vulnerability is accurate given the source code context of the identified vulnerability.

The deep learning models may include a neural encoder transformer model and/or neural decoder transformer model. Each model is trained for a particular type of vulnerability, such as a null dereference, memory leak, resource leak, etc. A neural encoder transformer model is trained to classify a false positive given the method body including the identified vulnerability. A neural decoder transformer model is trained to predict a candidate line-of-code to complete a prompt inserted into the context of the identified vulnerability. The candidate line-of-code that successfully completes the prompt is used as a signal to identify that the identified vulnerability is a false positive.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Aspects of the present invention pertain to the detection of false positive vulnerabilities identified from a static code vulnerability analyzer. The system utilizes deep learning models to identify whether a vulnerability detected from a static code vulnerability analyzer was correctly identified.

System

Figure 1:
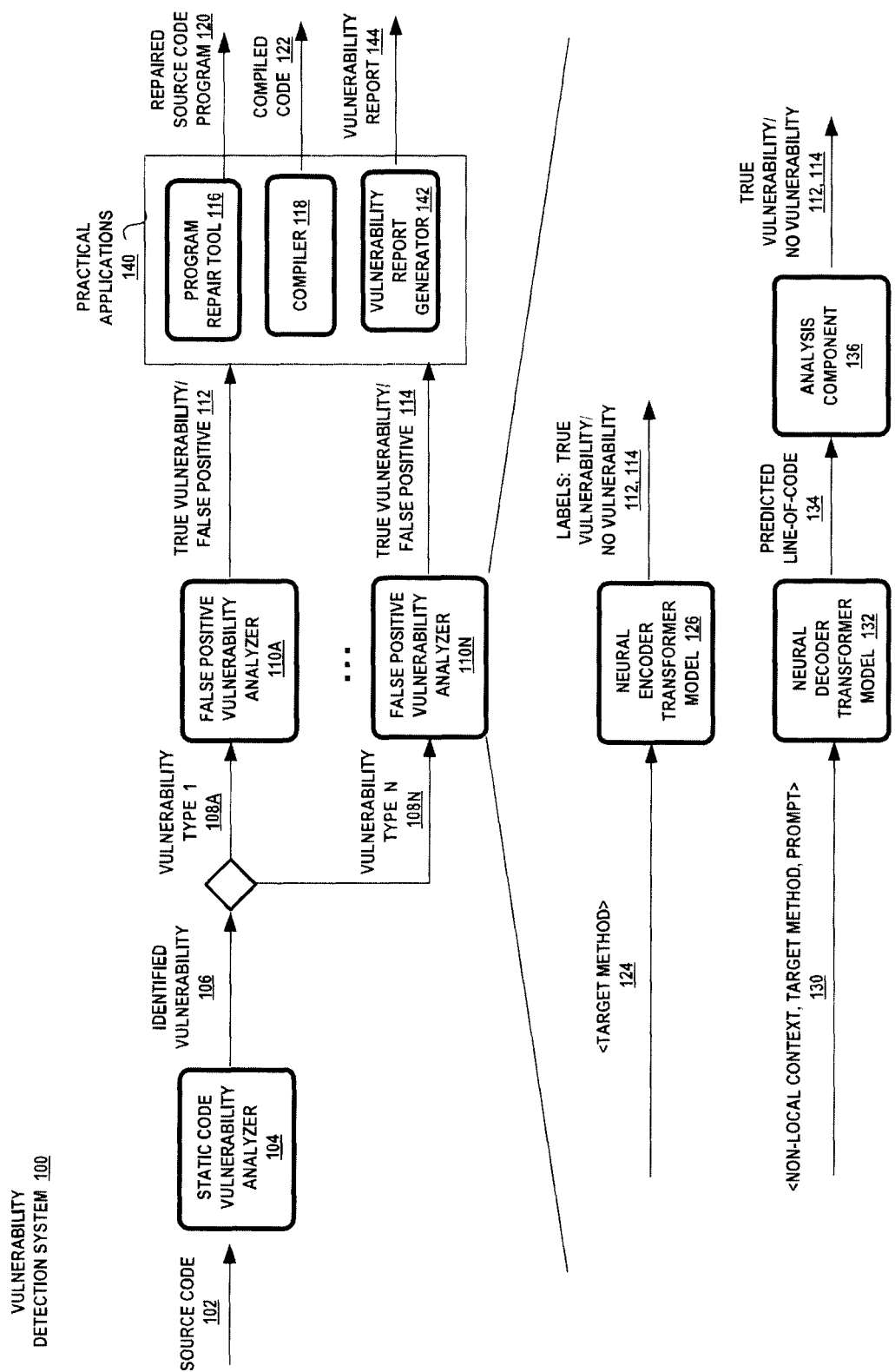
FIG. 1 illustrates an exemplary system for false positive vulnerability detection.

FIG. 1 illustrates an exemplary vulnerability detection system 100 in which various aspects of the invention may be practiced. The system 100 includes a static code vulnerability analyzer 104, a number of false positive vulnerability analyzers 110*a*-110*n* ("110"), and a number of practical applications 140 that utilize the output of the false positive vulnerability analyzers.

Each false positive vulnerability analyzer 110 is configured for a particular type of vulnerability, such as without limitation, a null dereference, a memory leak, etc. The system may be configured for any type of vulnerability, such as those found in the repository of known vulnerabilities listed in the national vulnerability database (NVD) and in the common vulnerabilities and exposures (CVE) list. The false positive vulnerability analyzer 110 may utilize a neural encoder transformer model 126, a neural decoder transformer model 132, and an analysis component 136.

The static code vulnerability analyzer 104 receives a source code program 102 and identifies whether or not vulnerabilities exist in the program. The static code vulnerability analyzer 104 analyzes the source code program 102 without executing the source code to find vulnerabilities. The static code vulnerability analyzer 104 differs from a compiler that checks for syntax errors. The static code vulnerability analyzer 104 checks the source code program 102 for suspectable source code that can lead to a security violation, such as a cybersecurity attack. A repository of known vulnerabilities is listed in the national vulnerability database (NVD) and in the common vulnerabilities and exposures (CVE) list.

Examples of the static code vulnerability analyzer 102 include, without limitation, Facebook®'s Infer, SpotBugs, Synopsys®'s Coverity, Clang, CodeQP, etc. It should be noted that although the techniques disclosed herein refer to Infer, this disclosure is not limited to Infer and that other static code vulnerability analyzer may be used.

Infer is an interprocedural code analyzer. An intraprocedural analysis is performed within a method, otherwise referred to as a procedure or function. An interprocedural analysis spans multiple files or methods, including all the methods in the entire program. An interprocedural static code analysis is able to detect memory safety faults that span multiple files or methods, such as null pointer dereferencing and memory leaks, which would be missed if intraprocedural static analysis were used.

Null pointer dereference occurs when the program dereferences a pointer that it expects to be valid, but is null, or points to memory that has not been allocated. Null pointer dereferences typically cause the program to crash or exit. A memory leak occurs when a program allocates memory without ever releasing it. Eventually, the program will exhaust all the available memory and crash when the program attempts to allocate additional memory.

Infer is based on separation logic that performs Hoare-logic reasoning about programs that mutate data structures. Infer uses the analysis language, Smallfoot Intermediate Language (SIL), to represent a program in a simpler instruction set that describes the program's actions on a symbolic heap. Infer symbolically executes the SIL commands over a symbolic heap according to a set of separation logic proof rules in order to discover program paths with the symbolic heap that violate heap-based properties.

It should be noted that SIL differs from intermediate languages, such as bytecodes or Microsoft®'s Common Intermediate Language (CIL), that represent instructions that can be transformed into native code. SIL instructions are used for a symbolic execution which is a logic-based proof analysis. The SIL instructions are not constructed to be executed on a processor or CPU such as the CIL instructions.

The static code vulnerability analyzer 104 generates results that indicate whether a particular type of vulnerability exists within the program. There is a false positive vulnerability analyzer 110A-110N ("110") for each type of identified vulnerability. For example, there is a false positive vulnerability analyzer 110 for null dereferences, another false positive analyzer for memory leaks, and so forth. The results from the static code vulnerability analyzer 104 is sent to the appropriate false positive vulnerability analyzer 110 based on the type of vulnerability detected.

Each false positive vulnerability analyzer 110 utilizes one or more deep learning models to predict whether an identified vulnerability is a false positive or a true vulnerability. A false positive vulnerability analyzer for a particular vulnerability type may include any one or more models.

In one aspect, the deep learning model is a neural transformer model with attention. Deep learning models differ from traditional machine learning models. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, support vector machines, and visual data mapping. Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

A neural transformer model with attention is one type of deep learning that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions. It should be noted that the term neural transformer model with attention and neural transformer model are used interchangeably.

There are different configurations of a neural transformer model. In one aspect, the techniques are applied to a neural encoder transformer model 126 and in a second aspect, the techniques are applied to a neural decoder transformer model 132. The system 100 may be configured to utilize both models or either one of the models.

The neural encoder transformer model 126 is used for classification. The neural encoder transformer model 126 generates an embedding for each source code token in the model's vocabulary as a bidirectional contextual representation of the token. The neural encoder transformer model 126 learns to predict a class label for a sequence of source code embeddings or input sequence that represents a target method body. The class label (i.e., no vulnerability or true vulnerability) identifies the likelihood that the identified vulnerability is likely to be a vulnerability.

The neural decoder transformer model 132 is an auto-regressive model that produces an output one element at a time based on the outputs of previous time steps. Code generation is best suited for a neural decoder transformer model 132 since it is an auto-regressive task that predicts an ordered sequence of tokens where the order depends on the preceding tokens in the sequence. The neural decoder transformer model 132 uses a masked self-head attention which is best suited for auto-regressive tasks since it is explicitly trained to generate auto-regressively.

The neural decoder transformer model 132 is used to predict the remaining source code tokens to complete a prompt. A prompt is a partially-formed line-of-code that resolves a vulnerability. A line-of-code refers to a physical line of source code that ends with an end-of-line character and which excludes blank lines and comment lines. A line-of-code may consist of various elements (e.g., keywords, delimiters, variables, methods, constants, operators, etc.) that are combined in a particular order in accordance with the grammar of the underlying programming language to form an expression. The line-of-code may be a method invocation, a program statement, a definition, an expression, and so forth. A partially-formed line-of-code is a physical line of source code that does not end in an end-of-line character and contains a few tokens.

The neural decoder transformer model 132 is used to complete a prompt inserted immediately before the identified vulnerability. The prompt is a partially-formed line-of-code consisting of a few source code tokens that when completed by the model is used as an indicator of the legitimacy of the vulnerability warning. In one aspect, there are multiple prompts for each type of vulnerability.

The prompt represents an expression that avoids the vulnerability. For example, null dereferences, in some situations, can be resolved by adding in a null check statement before the dereference usage. The prompt for a null dereference would be a partially-formed null check statement. Similarly, for memory leaks, an expression that releases the resource associated with the memory leak can be added in prior to a statement that accesses the resource. The prompt for the memory leak vulnerability is a partially-formed resource release statement.

If the neural decoder transformer model 132 generates a completed line-of-code 134 to complete any one of the prompts, then the completed line-of-code 134 indicates that the prompt is needed to avoid the vulnerability. The completed line-of-code 134 is a signal that the vulnerability is legitimate or a true vulnerability. If the neural decoder transformer model 132 does not generate a completed line-of-code for any of the prompts, this is a signal that the vulnerability is a false positive.

Each completed or predicted line-of-code 134 is then analyzed by the analysis component 136 to determine whether the completed line-of-code completes the prompt. Based on the results of the analysis, the analysis component 136 indicates either that the vulnerability detected by the static code vulnerability analyzer 104 is either a true vulnerability or a false positive 112, 114.

When a true vulnerability 112 is confirmed by the false positive vulnerability analyzer 110, the source code program 102 is utilized in one of many practical applications 140. A source code program having a true vulnerability may be repaired by a program repair tool 116 and the repaired source code program 120 used in an intended manner. When the false positive vulnerability analyzer 110 indicates that no vulnerability exists 114, the source code program may be compiled by a compiler 118 and the compiled code 132 used in an intended manner. Alternatively, the source code program and its vulnerability state may be collected by a bug report generator 142 that outputs a bug report 144. The practical applications that can utilize the false positive vulnerability detection system are endless.

In one aspect, the system 100 may be embodied in a software development environment, such as a source code editor or integrated development environment (IDE). A developer uses the source code editor or IDS to develop or maintain the source code. During an editing session in the source code editor or IDS, the developer may execute the static code vulnerability analyzer to detect vulnerabilities. The false positive vulnerability analyzers 110 may be used to determine whether or not a detected vulnerability is true or false in order to correct the vulnerability in the software development environment.

Alternatively, the system 100 may be part of an automated build and test system such as a continuous build and continuous delivery and deployment (CI/CD). A CI/CD system is a pipeline of tasks that build, test, deploy, and validate a source code application. The false positive vulnerability system may be part of one of the tasks used in the CI/CD system and used to determine whether an identified vulnerability actually exists prior to the build of the source code application.

In yet another embodiment, the system may be embodied in a distributed version control software system. The distributed version control software system may be part of a file archive and web hosting service for source code, documentation, and other related data stored in source code repositories. The source code repositories may be publicly-accessible or private. The service includes a version-control component that tracks changes made to the files in a source code repository over time.

The service monitors for changes made to source code of the source code repository and utilizes a static code vulnerability analyzer to ensure that a vulnerability is not incorporated into a change to the program. The service may utilize the vulnerability system to identify true vulnerabilities before the source code program changes are committed to the repository.

Attention now turns to a discussion of the neural transformer models.

Neural Encoder Transformer with Attention

Figure 2:
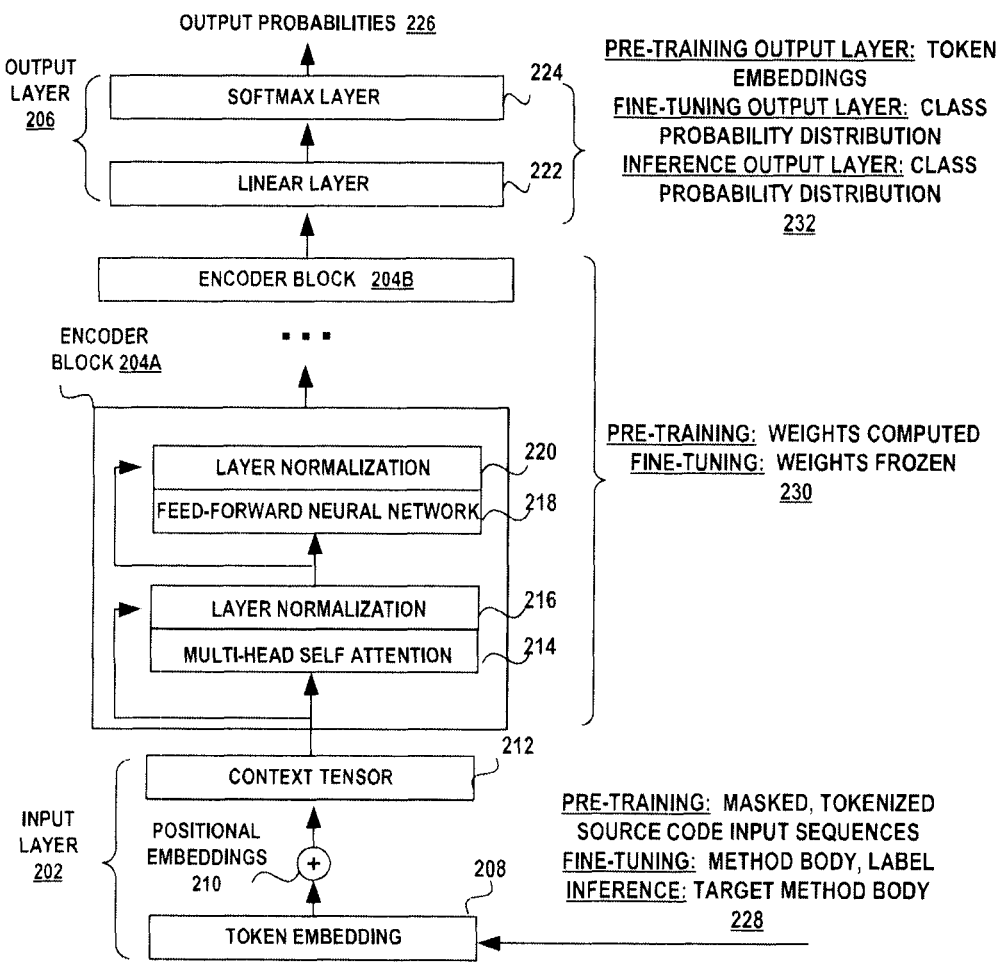
FIG. 2 is a schematic diagram illustrating an exemplary configuration of a neural encoder transformer model with attention.

FIG. 2 illustrates an exemplary configuration of a neural encoder transformer. The neural encoder transformer 200 includes an input layer 202, one or more encoder blocks 204A-204B ("204"), and an output layer 206. The input layer 202 includes token embeddings 208 of an input sequence and positional embeddings 210 that represents an order of the tokens in an input sequence. The token embeddings 208 and the positional embeddings 210 are combined to form a context tensor 212.

An encoder block 204 consists of two layers. The first layer includes a multi-head self-attention component 214 followed by layer normalization component 216. The multi-head self-attention component 214 takes a context tensor 212 and weighs the relevance of each token represented in the context tensor to each other by generating attention weights for each token in the token embedding 208. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots, \text{head}_h)W^O,$$

where $\text{head}_i=\text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

Attention is used to decide which parts of the input sequence are important for each token. Attention mechanisms gather information about the relevant context of a given token and then encode that context into a vector which represents the token. It is used to identity the relationships between tokens in the long sequence while ignoring other tokens that do not have much bearing on a given prediction.

The second layer includes a feed-forward neural network 218 followed by a layer normalization component 220. The context tensor 212 is input into the multi-head self-attention layer 214 of the first encoder block 204A with a residual connection to layer normalization 216. The output of the layer normalization 216 is input to the feed forward neural network 218 with another residual connection to layer normalization 220. The output of each encoder block is a set of hidden representations which are then sent through additional encoder blocks, if multiple encoder blocks exist, or to the output layer 206.

The output layer 206 includes a linear layer 222 and a softmax layer 224. The linear layer 222 projects the vector produced by the stack of decoders into a logits vector. The softmax layer 224 then turns the scores of the logits vector into output probabilities 226.

Neural Decoder Transformer with Attention

The task of neural decoder transformer model is to predict a sequence of response tokens, $m_t$, $t=0 \ldots N$, conditioned on an ordered sequence of tokens $c_t$, $t=0 \ldots T$, corresponding to a context of code snippet C as the product of conditional probabilities by estimating a conditional probability distribution P(Output|Input) as follows:

$$P(m_0, m_1, \ldots, m_N | c_0, c_1, \ldots, c_T) = \mathring{A}_{i=1}^{N} P(m_i | c_0, c_1, \ldots c_T, m_0, \ldots m_{i-1}).$$

The false positive vulnerability analyzer uses a beam search to generate candidate sequences to complete the prompt. The neural decoder transformer model is given a non-local context, the target method where the vulnerability exists, and a prompt. The beam search uses the probability distribution generated by the neural decoder transformer model to identify the top k tokens likely to be the next token in a candidate sequence.

The beam search expands the search by instantiating new partial sequences using each of the selected tokens identified by the neural decoder transformer model's probability distribution. The search continues generating new partial sequences from the top k tokens identified by the output distributions from the neural decoder transformer model until the search ends. The search may end when the end-of-line token appears as the most probable next token.

Figure 3:
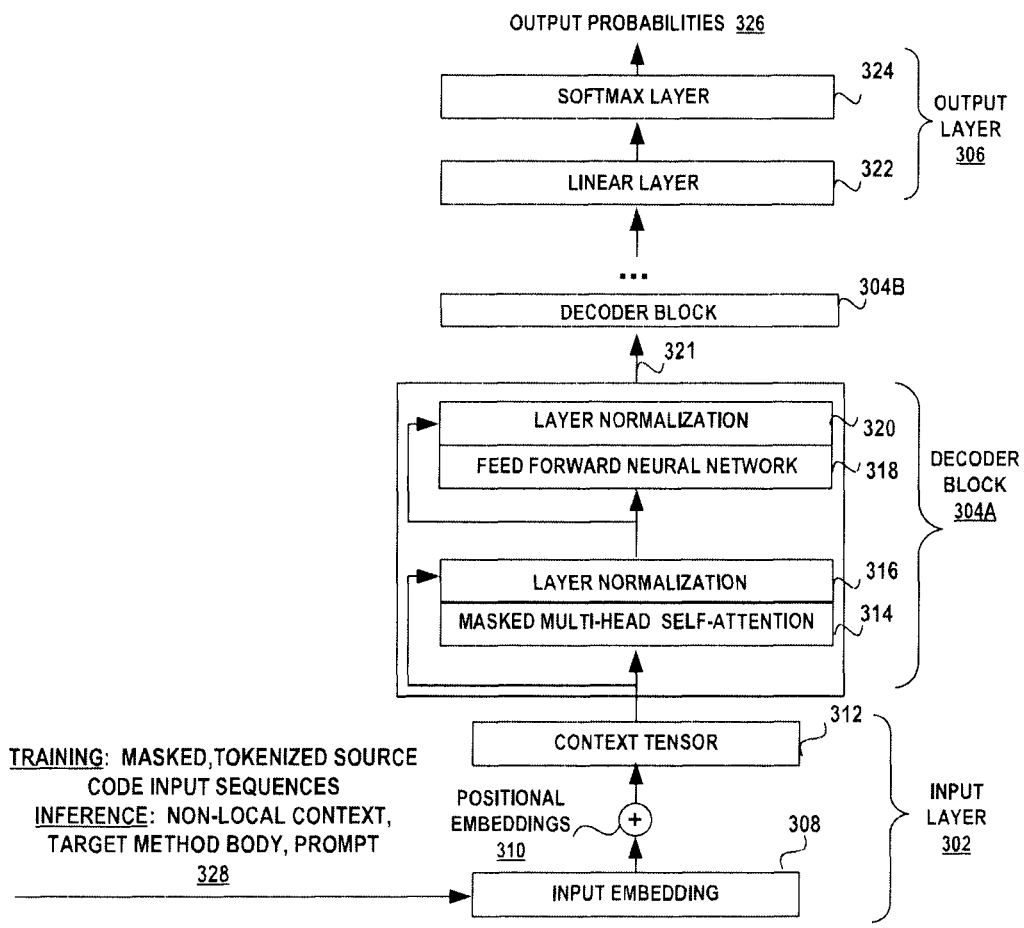
FIG. 3 is a schematic diagram illustrating an exemplary configuration of a neural decoder transformer model with attention.

Turning to FIG. 3, there is shown an exemplary configuration of a neural decoder transformer model with attention 300. The decoder neural transformer model 300 includes an input layer 302, one or more decoder blocks 304A-304B ("304"), and an output layer 306. The input or embedding layer 302 generates a context tensor 312 that is the sum of the token embeddings 308 and positional embeddings 310 of an input sequence.

A decoder block 304 consists of two layers. The first layer includes a masked self-attention component 314 followed by a layer normalization component 316. The input to the masked multi-head self-attention component 314 has a residual connection to layer normalization 316. The output of layer normalization 316 is input into the feed forward neural network 318 with a residual connection to layer normalization component 320. The output of the feed forward neural network 318 is input into layer normalization component 320.

The masked multi-head attention component 314 takes a context tensor 312 and weighs the relevance of each token represented in the context tensor 312 to each other by generating attention weights for each token in the context tensor 312.

Each token flows through all the decoder blocks along its own path. The masked self-attention component 314 allows the feed forward neural network 318 to focus on certain features or inputs. The decoder block 304 predicts each token $t_i$ in the target language one-by-one at each time step conditioned on all previously-generated target tokens $t_1, \ldots t_{i-1}$.

The masked self-attention component 314 masks the output embeddings from future time steps. The feed-forward neural network 318 processes each output embedding separately. A layer normalization component 316, 320 is used between the layers in order to normalize the inputs across the features.

The output layer 306 includes a linear layer 322 and a softmax layer 324. The linear layer 324 projects the vector produced by the stack of decoders into a logits vector. The softmax layer 324 then turns the scores of the logits vector into output probabilities for each token in the model's vocabulary which are positive and normalized.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Training the Models

Figure 4:
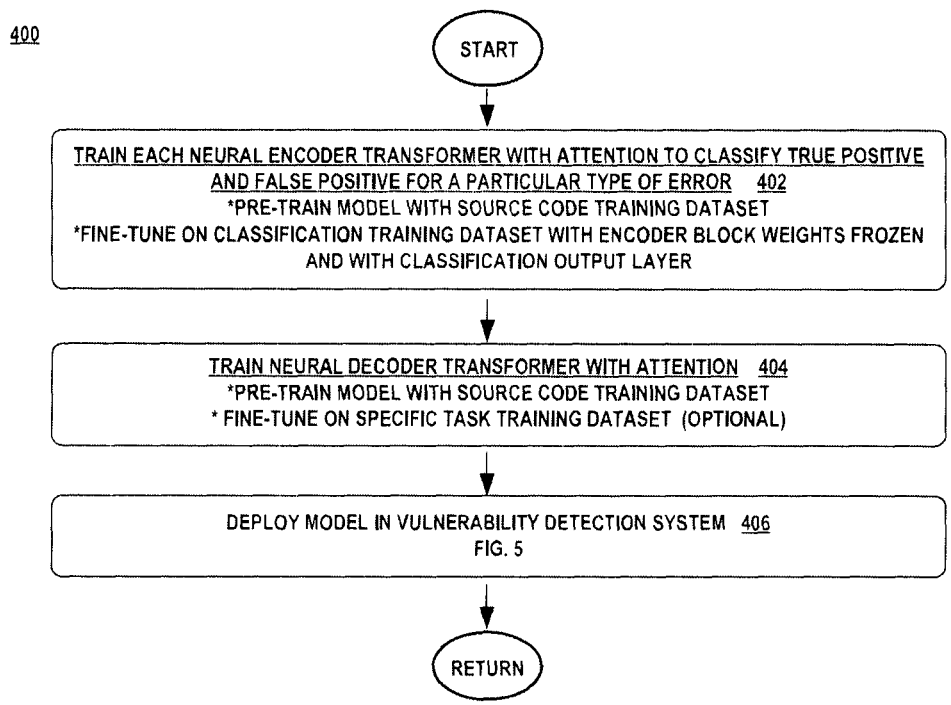
FIG. 4 is a flow chart illustrating an exemplary method of training the neural transformer models for deployment into a software development system.

Turning to FIG. 4, there is shown an exemplary method for training the neural encoder transformer model to classify a target method body as including a true vulnerability or a false positive. The neural encoder transformer model is pre-trained to learn the structure of source code and then fine-tuned for the classification task (block 402).

Turning to FIGS. 2 and 4, the neural encoder transformer model 200 is pre-trained 228 using a masked language model objective. A pre-training dataset is constructed from source code programs of a source code repository. Each source code program is parsed into a parse tree and a byte-level byte-pair extraction component is used to generate T-ordered sequences of tokens, where T is the maximum context length. Byte-level byte-pair encoding (BBPE) is used to generate the vocabulary used by the neural transformer model with attention.

A denoising function, such as a span masking function, is then applied to each sequence that randomly masks out a subset of tokens and the masked span of tokens is replaced with a mask token, M The model is trained with the masked sequences to learn to reconstruct the original sequence without the masked tokens. The benefit of span-masking denoising in pre-training is that the model learns the desired programming language in an unsupervised fashion, but also is bi-directional in the sense that it learns the relationships of words both before and after their occurrence. The model is trained with the masked sequences to learn to reconstruct the original sequence without the masked tokens. (Collectively, block 402).

The neural encoder transformer model 200 is then fine-tuned with a supervised training dataset of method bodies that are labeled with a class that represents either a true vulnerability or a false positive 228. During inference 228, the neural encoder transformer model 200 is given a method body and predicts a class label for the method body. (Collectively, block 402).

The configuration of the neural encoder transformer model is the same for pre-training and fine-tuning except for the output layers. The output layer for the pre-training phase 232 learns the embeddings for each token of the model's vocabulary. The output layer for the fine-tuning phase 232 learns a classification label for each input sequence of embeddings. During inference, the output layer from the fine-tuning phase 232 is used to generate the class probability distribution for the target method body (Collectively, block 402).

The fine-tuning of the neural encoder transformer model is a process where the model learns which weights and biases (i.e., parameters) minimize a cost function which results in a better fitting model. In fine-tuning, the weights and biases used in the various layers of the encoder blocks are frozen while only the weights and biases are learned in the classification output layer 230. (Collectively, block 402).

Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 402).

For each input sequence of each batch in each epoch, the T-ordered sequences of tokens are then mapped into numeric vectors and then into respective token embeddings and positional embeddings. An embedding is a learned representation for the text-based tokens where tokens that have a common meaning have a common representation. An embedding is a mapping of discrete categorical variables to a vector of continuous numbers. There is an embedding for each token in the vocabulary and a corresponding positional embedding. The token embedding represents the learned representation for the token. The neural transformer model does not read each token sequentially and as such, has no knowledge of the token's position in a sequence without additional position information. The positional embedding is used to embed position information about a token's position in an input sequence into the neural transformer model. (Collectively, block 402).

Initial values are generated for the token embedding and positional embeddings of each sequence which are then used to form a context tensor. Thereafter, the neural transformer model learns the values for each embedding. Upon the completion of the pre-training phase, the embeddings for each token and the positional embeddings are saved into respective matrices for later use. There is a token embedding matrix, We, that contains an embedding vector for each token $t_i$, i=0 . . . V, and a positional embedding matrix, Wp, that contains an embedding vector $P_j$, j=0 . . . T, for each position, where V is the size of the vocabulary and T is the length of the token sequence. (Collectively, block 402).

Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 402).

Figure 5:
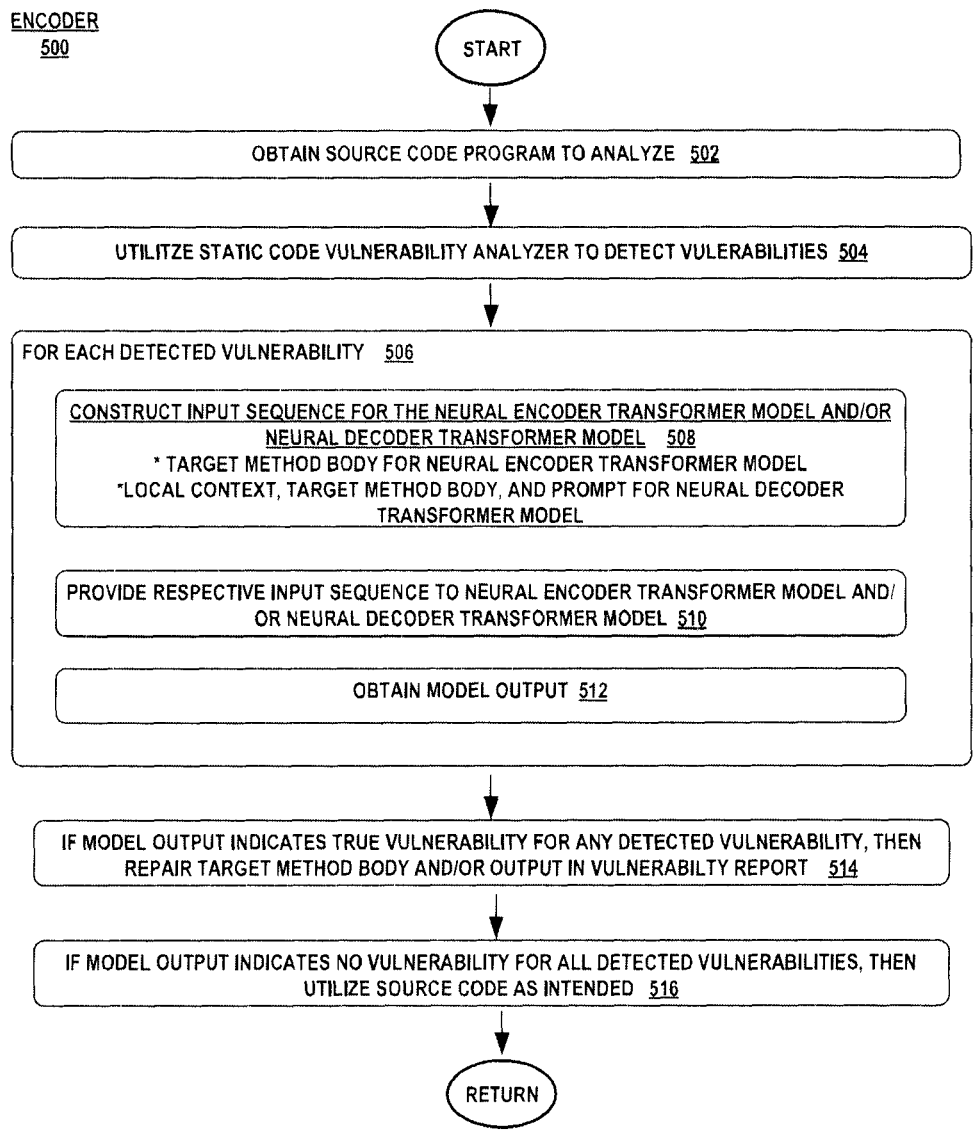
FIG. 5 is a flow chart illustrating an exemplary method for performing the false positive vulnerability detection using the neural transformer models.

Referring to FIGS. 3 and 5, the neural decoder transformer model is trained in a similar manner as described above except there is an optional fine-tuning phase and the input sequences differ. The neural decoder transformer model is pre-trained on a masked language modeling objective using input sequences extracted from source code programs written in different programming languages 328. Optionally, the pre-trained neural decoder transformer model may be fine-tuned with a specific training dataset tailored for the task at hand. During inference, the neural decoder transformer model is given an input sequence representing a non-local context, the target method, and a prompt 328. The neural decoder transformer model outputs a probability distribution over the model vocabulary to select the most promising token to complete a predicted candidate sequence. (Collectively, block 404).

Upon completion of the training of the neural encoder transformer model and the neural decoder transformer model, one or both of the models is deployed in a vulnerability detection system (block 406).

Inference Process

Attention now turns to a discussion of an embodiment of the false positive vulnerability detection using the neural encoder transformer model and/or the neural decoder transformer model. The vulnerability detection system may utilize either neural transformer model or both models concurrently.

Turning to FIG. 5, there is shown an exemplary method 500 for false positive vulnerability detection using a neural transformer model. A source code program is obtained containing numerous methods or method bodies (block 502). A static code vulnerability analyzer analyzes the source code program and identifies one or more vulnerabilities within the source code program (block 504). The static code vulnerability analyzer may output a vulnerability warning that includes the line number where the vulnerability occurs in a method body and the type of vulnerability (block 504).

For each of the detected vulnerabilities (block 506), an input sequence for the appropriate model is generated (block 508). For the neural encoder transformer model, the input sequence includes the target method body identified from the static code vulnerability analyzer having the vulnerability (block 508). Each input sequence is transformed into a sequence of token embeddings and associated positional embeddings (block 508) and is provided as input to the respective neural transformer model (block 510). The model output is obtained and analyzed for a true vulnerability or a false positive (block 512). For the neural decoder transformer model, the input sequence includes a non-local context, the target method body, and a prompt (block 508).

Figure 6:
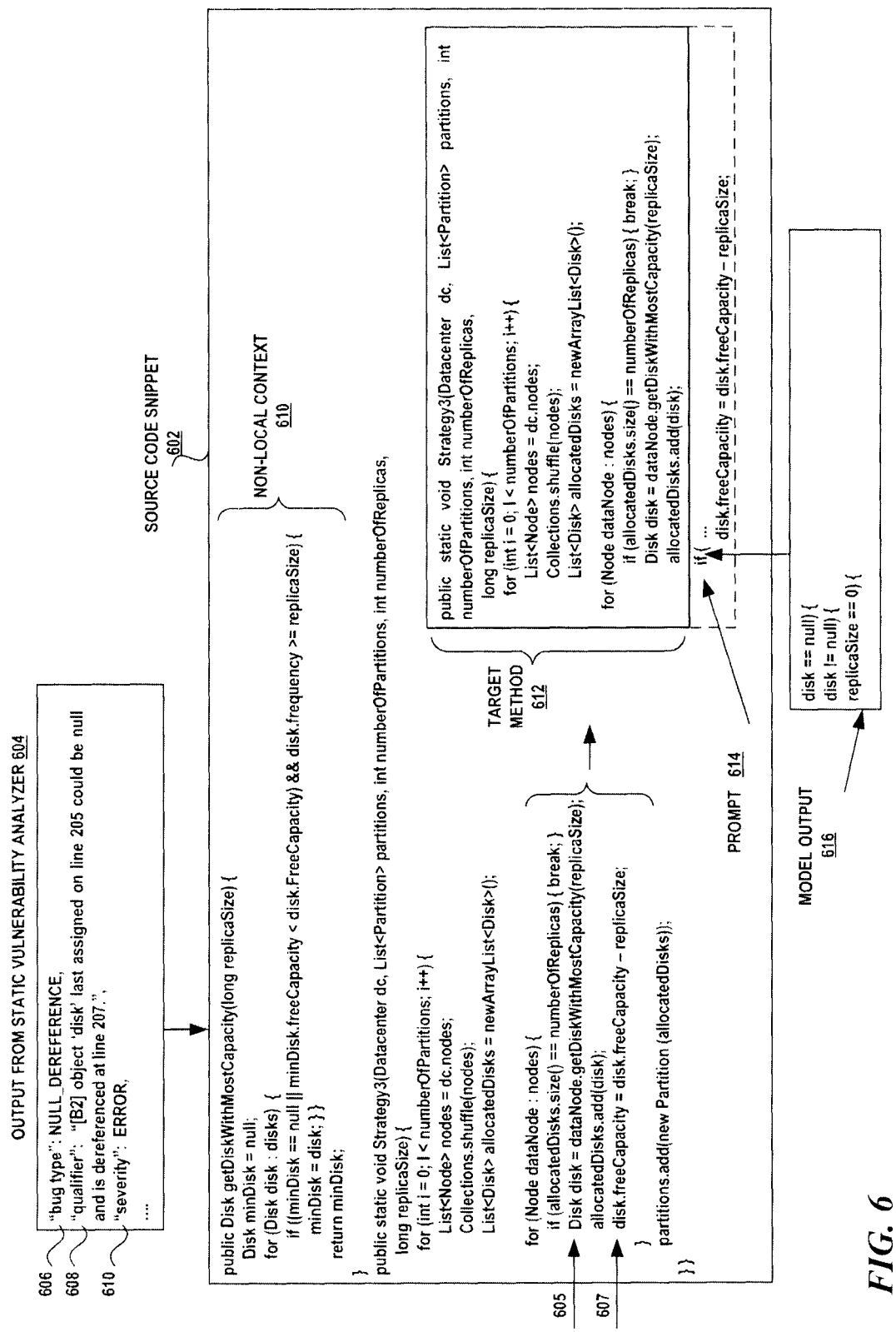
FIG. 6 is a schematic diagram illustrating an exemplary construction of the input features for the neural decoder transformer model from a source code program.

Turning to FIG. 6, there is shown an exemplary source code snippet 602 having a null dereference vulnerability. In one aspect, the output from the static code vulnerability analyzer 604 is formatted as a JavaScriptObjectNotation ("JSON") file that indicates the error type as null dereference vulnerability 606, a description of the vulnerability including the line of code containing the vulnerability and the location of the vulnerability 608, and the severity of the vulnerability 610. The static code vulnerability analyzer indicates that the variable disk, which is assigned in the method getDiskWithMostCapacity( ) at line 205, can be null and is dereferenced on line 207. The non-local context 610 is the function or methods that were called in the context of the vulnerability. In the present example, the method getDiskWithMostCapacity( ) is called in the method Strategy3, which contains the vulnerability, and is the non-local context. The target method body 612 includes all the lines-of-code of the method, Strategy3, up to the line of code having the vulnerability. The prompt 614 is the beginning of a null check statement that ordinarily would be used in the program to check for a null dereference before accessing the variable disk.

The neural decoder transformer model is given the non-local context, the target method body, and a prompt and may output a completed line-of-code or incomplete line-of-code for the prompt. The model may be given several input sequences each of which may include a different prompt for the same non-local context and target method body. For the example shown in FIG. 6, other prompts include "Int", "str", "Str", "Deb", "Ver", "Obj". There are various ways to implement a null check and the different prompts are used to ensure that the model completes at least one of the prompts.

As shown in FIG. 6, the model output 616 completes the "if ("prompt with the following predictions: "disk==null) {"; "disk !=null {"; and "replicaSize==0) {".

Turning back to FIG. 5, the model output from the neural encoder transformer model and/or the neural decoder transformer model is analyzed to determine whether the identified vulnerability is true or a false positive. If any one of the neural encoder transformer models indicates that a vulnerability is a true vulnerability, then any one of the practical applications may be utilized. The source code program may be repaired or the detected vulnerability may be output in a vulnerability report. If any one of the neural encoder transformer models indicates that a vulnerability is a false positive, the source code program is then used as intended (Collectively, blocks 514, 516).

If a neural decoder transformer model outputs a completed line-of-code for any one of the prompts, then this output is a signal of a true vulnerability. Otherwise, if the neural decoder transformer model does not output a completed line-of-code for the prompt, then the vulnerability is a false positive. (Collectively, blocks 514, 516).

Exemplary Operating Environment

Figure 7:
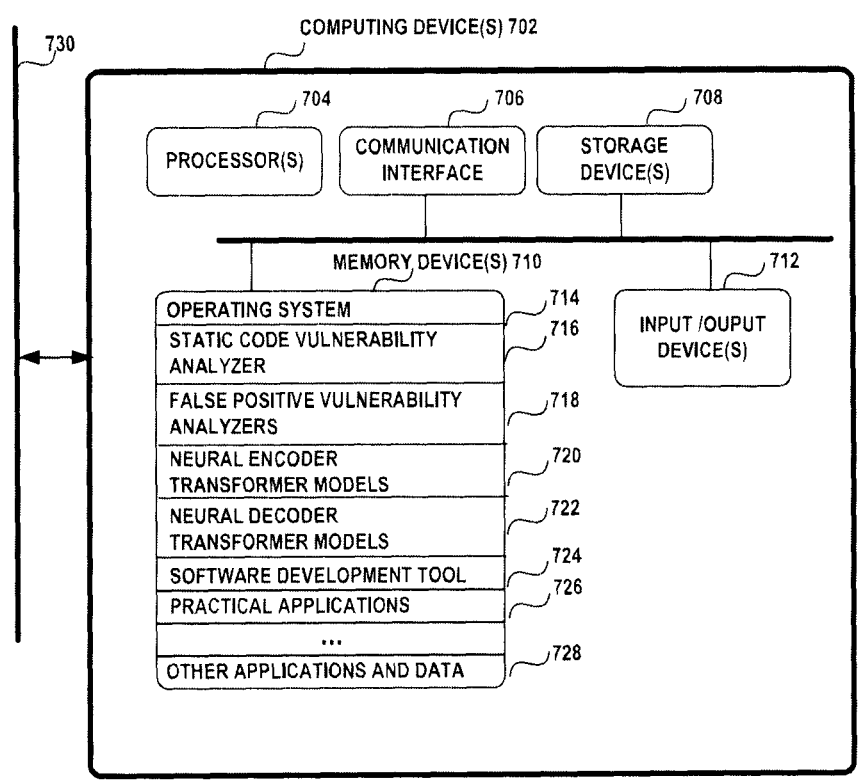
FIG. 7 is a block diagram illustrating an exemplary operating environment.

Attention now turns to a discussion of an exemplary operating environment. FIG. 7 illustrates an exemplary operating environment 700 used to generate examples for command-line commands. The operating environment 700 may be configured as a cloud service having multiple computing devices 702 or configured as a single computing device 702. The computing devices 702 are coupled to a network 732 to other computing devices. However, it should be noted that the aspects disclosed herein is not constrained to any particular configuration of devices and that other configurations are possible.

A computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 700 may be configured in a network environment, a distributed environment, a multi-processor environment, or a stand-alone computing device having access to remote or local storage devices.

A computing device 702 may include one or more processors 704, one or more communication interfaces 706, one or more storage devices 708, one or more memory devices 710, and one or more input/output devices 712. A processor 704 may be any commercially available or customized processor and may include dual microprocessors and multi-processor architectures. A communication interface 706 facilitates wired or wireless communications between the computing devices and other devices.

A storage device 708 may be computer-readable medium that does not contain propagating signals, such as modulated data signals transmitted through a carrier wave. Examples of a storage device 708 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 712 may include a keyboard, mouse, pen, voice input device, touch input device, display, speakers, printers, etc., and any combination thereof.

A memory device or memory 710 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 710 may also include one or more external storage devices or remotely located storage devices that do not pertain to propagated signals, such as modulated data signals transmitted through a carrier wave.

Memory device 710 may include an operating system 714, a static code vulnerability analyzer 716, false positive vulnerability analyzers 718, neural encoder transformer models 720, neural decoder transformer models 722, a software development tool 724, practical applications 726, and other application and data 728.

Network 730 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

Network 730 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of detecting false positive vulnerabilities incorrectly identified from a static code vulnerability analyzer. The technical features associated with addressing this problem are the deep learning models that are trained to learn patterns in source code that signal a false positive vulnerability. The deep learning models are trained on real-word data making them more adapt to learn new patterns from data not seen during training than traditional rule-based tools. The technical effect achieved is the reduction of the computing resources and developer time needed to remedy the false positive vulnerability and the improved development time of the software application.

CONCLUSION

A system is disclosed comprising one or more processors coupled to a memory. The memory includes one or more programs configured to be executed by the one or more processors. The one or more programs including instructions to performs actions that: obtain a source code program having an identified vulnerability; extract features from the source code program representing a context of the identified vulnerability; predict through a deep learning model, given the extracted features, whether the vulnerability is a false positive; and upon the deep learning model predicting that the identified vulnerability is a false positive, utilize the source code program in a target software development environment.

In an aspect, the one or more programs include instructions to perform actions that: access the identified vulnerability from a static code vulnerability analyzer. In an aspect, the one or more programs include instructions to perform actions that: insert a prompt in the source code program to resolve the identified vulnerability; generate, by the deep learning model, a candidate line-of-code to complete the prompt; and upon the candidate line-of-code successfully completing the prompt, indicate that the identified vulnerability is a true vulnerability.

In an aspect, the one or more programs include instructions to perform actions that: upon the candidate line-of-code failing to complete the prompt, indicate that the identified vulnerability is a false positive. In an aspect, the extracted features include a non-local context, a method body including the identified vulnerability, and the prompt. In an aspect, the deep learning model is a neural encoder transformer model with attention and/or a neural decoder transformer model with attention. In an aspect, the deep learning model is a neural decoder transformer model with attention.

A computer-implemented method is disclosed comprising: receiving a source code program having a detected vulnerability; accessing a deep learning classifier to classify the detected vulnerability as a true vulnerability or a false positive given a source code method body having the detected vulnerability; upon the deep learning classifier classifying the detected vulnerability as a true vulnerability, repairing the vulnerability; and upon the deep learning classifier classifying the detected vulnerability as a false positive, utilizing the source code program in a software development environment.

In an aspect, the computer-implemented method further comprises inserting a prompt in the source code program to resolve the detected vulnerability, wherein the prompt is a partially-formed line-of-code; accessing a deep learning decoder to predict a candidate line-of-code to complete the prompt; and using the candidate line-of-code as a signal that indicates whether the detected vulnerability is a true vulnerability or a false positive.

In an aspect, the computer-implemented method further comprises: upon the candidate line-of-code completing the prompt, indicating a false positive vulnerability. In an aspect, the computer-implemented method further comprises: upon the candidate line-of-code failing to complete the prompt, indicating a true vulnerability. In an aspect, the deep learning decoder is a neural decoder transformer model with attention. In an aspect, the deep learning classifier is a neural encoder transformer model with attention. In an aspect, the detected vulnerability includes one of a null dereference, a memory leak, a resource leak, and concurrency error.

Another computer-implemented method is disclosed, comprising: obtaining a source code program having a predicted vulnerability; inserting a prompt, to resolve the predicted vulnerability, in a source code method of the source code program having the predicted vulnerability, wherein the prompt is a partially-formed line-of-code; accessing a deep learning decoder to predict a candidate to complete the prompt given features extracted from the source code program; determining that the candidate is a syntactically-correct line-of-code that completes the prompt; and correcting the predicted vulnerability.

In an aspect, the features include a non-local context, the source code method, and the prompt. In an aspect, the computer-implemented method further comprises accessing a deep learning encoder to classify the predicted vulnerability, given the source code method, as either a true vulnerability or a false positive. In an aspect, the computer-implemented method further comprises upon the deep learning encoder classifying the predicted vulnerability as a true vulnerability, repairing the source code to eliminate the true vulnerability. In an aspect, the predicted vulnerability includes one of a null dereference, a memory leak, a resource leak, and concurrency error. In an aspect, the deep learning decoder is a neural decoder transformer model with attention.

In the description above, specific details of various aspect are provided. However, some aspects may be practiced with less than all of the specific details and in other aspects, certain methods, procedures, components, structures, devices, processes and/or functions are described in no more detail than to enable the various aspects of the invention for the sake of brevity and clarity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   one or more processors coupled to a memory; and
   one or more programs, wherein the one or more programs are stored in the memory and configured to be executed by the one or more processors, the one or more programs including instructions to performs actions that:

obtain a source code program in an editing session of a software development environment having an identified software vulnerability of an identified vulnerability type;

extract features from the source code program representing a context of the identified software vulnerability, wherein the extracted features include a method containing the identified software vulnerability and the identified vulnerability type;

cause a deep learning model, given the extracted features, to determine whether the software vulnerability is a false positive, wherein the deep learning model is trained to identify, for the identified vulnerability type, whether the identified software vulnerability is a false positive; and upon the deep learning model determining that the identified software vulnerability is a false positive, utilize the source code program in the software development environment.

2. The system of claim 1, wherein the one or more programs include instructions to perform actions that:
access the identified software vulnerability from a static code vulnerability analyzer.

3. The system of claim 1, wherein the one or more programs include instructions to perform actions that:
insert a prompt in the source code program to resolve the identified software vulnerability;
cause a second deep learning model to generate a candidate line-of-code to complete the prompt; and
upon the candidate line-of-code successfully completing the prompt, indicate that the identified software vulnerability is a true vulnerability.

4. The system of claim 3, wherein the one or more programs include instructions to perform actions that:
upon the candidate line-of-code failing to complete the prompt, indicate that the identified software vulnerability is a false positive.

5. The system of claim 3, wherein the extracted features include a non-local context, a method body including the identified software vulnerability, and the prompt.

6. The system of claim 3, wherein the second deep learning model is a neural decoder transformer model with attention.

7. The system of claim 1, wherein the deep learning model is a neural encoder transformer model with attention.

8. A computer-implemented method comprising:
receiving a source code program having a detected software vulnerability of an identified vulnerability type in an editing session of a software development environment;
causing a deep learning classifier to classify the detected software vulnerability of the identified vulnerability type as a true vulnerability or a false positive given a source code method body having the detected software vulnerability of the identified vulnerability type, wherein the deep learning classifier is trained to identify, for the identified vulnerability type, whether the identified vulnerability type is false positive or true vulnerability;
upon the deep learning classifier classifying the detected software vulnerability of the identified vulnerability type as a true vulnerability, repairing the detected software vulnerability; and
upon the deep learning classifier classifying the detected software vulnerability as a false positive, utilizing the source code program in the software development environment.

9. The computer-implemented method of claim 8, comprising:
inserting a prompt in the source code program to resolve the detected software vulnerability, wherein the prompt is a partially-formed line-of-code;
accessing a deep learning decoder to predict a candidate line-of-code to complete the prompt; and
using the candidate line-of-code as a signal that indicates whether the detected software vulnerability is a true vulnerability or a false positive.

10. The computer-implemented method of claim 9, comprising:
upon the candidate line-of-code completing the prompt, indicating a false positive vulnerability.

11. The computer-implemented method of claim 9, comprising:
upon the candidate line-of-code failing to complete the prompt, indicating a true vulnerability.

12. The computer-implemented method of claim 9, wherein the deep learning decoder is a neural decoder transformer model with attention.

13. The computer-implemented method of claim 8, wherein the deep learning classifier is a neural encoder transformer model with attention.

14. The computer-implemented method of claim 8, wherein the detected software vulnerability includes one of a null dereference, a memory leak, a resource leak, or concurrency error.

15. A computer-implemented method, comprising:
obtaining a source code program having a predicted software vulnerability of a particular software vulnerability type in a software development environment;
inserting a prompt, to resolve the predicted software vulnerability, in a source code method of the source code program having the predicted software vulnerability, wherein the prompt is a partially-formed line-of-code;
accessing a deep learning decoder to predict a candidate to complete the prompt given features extracted from the source code program;
determining that the candidate is a syntactically-correct line-of-code that completes the prompt;
identifying the predicted software vulnerability as a true vulnerability when the candidate is determined to be a syntactically-correct line-of-code that completes the prompt; and
correcting the predicted software vulnerability in the source code program in the software development environment.

16. The computer-implemented method of claim 15, wherein the features include a non-local context, the source code method, and the prompt.

17. The computer-implemented method of claim 15, further comprising:
accessing a deep learning encoder to classify the predicted software vulnerability, given the source code method, as either a true vulnerability or a false positive.

18. The computer-implemented method of claim 17, further comprising:
upon the deep learning encoder classifying the predicted software vulnerability as a true vulnerability, repairing the source code to eliminate the true vulnerability.

19. The computer-implemented method of claim 15, wherein the predicted software vulnerability includes one of a null dereference, a memory leak, a resource leak, or concurrency error.

20. The computer-implemented method of claim 15, wherein the deep learning decoder is a neural decoder transformer model with attention.

* * * * *